United States Patent [19]

Komori et al.

[11] 4,247,192
[45] Jan. 27, 1981

[54] COPYING MACHINE

[75] Inventors: Shigehiro Komori; Hiroshi Ogawa, both of Yokohama, Japan

[73] Assignee: Canon Kabushiki Kaisha, Tokyo, Japan

[21] Appl. No.: 953,597

[22] Filed: Oct. 23, 1978

[30] Foreign Application Priority Data

Oct. 26, 1977 [JP] Japan ................................ 52-128431
Dec. 9, 1977 [JP] Japan ................................ 52-148516
Jan. 30, 1978 [JP] Japan ................................ 53-9165

[51] Int. Cl.³ ........................................... G03G 15/28
[52] U.S. Cl. ......................................... 355/8; 355/11; 355/23; 355/25; 355/46; 355/66
[58] Field of Search .................... 355/8, 11, 23–26, 355/3 SH, 46, 51, 65, 66; 271/9

[56] References Cited

U.S. PATENT DOCUMENTS

| | | | |
|---|---|---|---|
| 3,645,615 | 2/1972 | Spear | 355/3 |
| 3,762,813 | 10/1973 | Fowlie et al. | 355/11 |
| 3,833,296 | 9/1974 | Vola et al. | 355/8 |
| 3,957,368 | 5/1976 | Goshima et al. | 355/8 |
| 4,077,714 | 3/1978 | Komori et al. | 355/8 X |
| 4,080,064 | 3/1978 | Kemori et al. | 355/51 |
| 4,099,150 | 7/1978 | Connin | 355/23 X |
| 4,110,030 | 8/1978 | Knechtel | 355/24 X |

Primary Examiner—R. L. Moses
Attorney, Agent, or Firm—Fitzpatrick, Cella, Harper & Scinto

[57] ABSTRACT

A copying machine including a first sheet original illuminating and conveying device for moving sheet originals and exposing the same to light, a second sheet original illuminating and conveying device for moving sheet originals disposed at a position which does not interfere with the first sheet original illuminating and conveying device and exposing the same to light, a device for controlling a sheet original so that one surface of the sheet original is exposed to light by the first sheet original illuminating and conveying device and so that the other surface of the sheet original is exposed to light by the second sheet original illuminating and conveying device, a main optical device for forming a first and a second optical path so as to enable one of the images of the sheet original conveyed by the first or the second sheet original illuminating and conveying device to be selectively exposed at an exposure position near a photosensitive medium, and a first movable mirror change-over device for selecting one of the two optical paths of the optical device.

11 Claims, 11 Drawing Figures

COPYING MACHINE

BACKGROUND OF THE INVENTION

1. Field of the Invention

This invention relates to a both-side copying machine, and more particularly to a copying machine in which two slit exposure systems and sheet conveying means are provided and which is provided with a sheet-like original exposure device for conveying sheet originals so that one side of an original having information on the front and back sides thereof (hereinafter referred to as both-side original) is exposed to light in one exposure system while the other side of the both-side original is exposed to light in the other exposure system.

2. Description of the Prior Art

Various types of so-called both-side copying machines which can copy original images on both sides of a copy sheet (hereinafter referred to as both-side copying) have heretofore been proposed as disclosed in U.S. Pat. No. 3,645,615 and some of them have been put into practice. However, any of these has not been sufficiently satisfactory in regard to the device for conveying both-sided originals so that the images on the both sides of a both-sided original are automatically opposed to an original illuminating station for exposure and in reality, the users of the copying machines have taken the trouble to manually change the surface to be illuminated each time. Accordingly, the both-side copying can be effected entirely automatically with respect to copy sheets, whereas the manual work of changing the surface to be illuminated from the front surface to the back surface (or from the back surface to the front surface) has been involved with respect to the sheet originals, and there is a problem that the users cannot carry out the copying operation entirely automatically. In this sense, technical advances in this field have been desired.

SUMMARY OF THE INVENTION

It is an object of the present invention to eliminate the manual work and to provide a copying machine having an exposure device for original sheets which can automatically effect a copying operation for both-sided originals.

It is another object of the present invention to provide a copying machine having a device for automatically feeding and exposing original sheets so that the same surface to be copied is reciprocated a plurality of times for the same exposure system to provide a plurality of copy sheets from a single original.

It is still another object of the present invention to provide a copying machine having a device for automatically feeding a plurality of original sheets successively to an exposure system.

It is a further object of the present invention to provide a compact copying machine in which the directions of conveyance of sheet originals by two sheet original conveying means are disposed to intersect each other.

It is a further object of the present invention to provide a two-mode copying machine which can automatically copy the front and back sides of a sheet original.

It is still a further object of the present invention to provide a two-mode copying machine in which a common lens may be used in the optical path from a sheet original image and the optical path from the image of an original on the original supporting carriage and the change-over of the two optical paths can be effected by a single mirror to thereby minimize the number of two-mode change-over mirrors while at the same time the change-over of the optical path for exposing the front and back sides of a sheet original may be effected by a single mirror to thereby minimize the number of change-over mirrors and enhance the reliability of the image formation and of the change-over operation.

It is a further object of the present invention to provide a copying machine which comprises a scanning optical system having an illuminating lamp, mirrors and a lens for forming the image of an original supported on an original supporting carriage supporting thereon a stationary original or a scanning optical system for moving the original supporting carriage and an optical system having an illuminating lamp, mirrors and a lens for forming the image of an original fed by an original feeding system through the illuminating station for the original, whereby said optical system repeatedly exposes the sheet original reciprocated a plurality of times during the movement thereof in one direction.

It is a further object of the present invention to provide a two-mode copying machine which is provided with an original supporting carriage reciprocable on top of the machine housing, a sheet original conveying means disposed at a position in the direction opposite to the direction of movement of the original supporting carriage for scanning the original image on the carriage and whereat the sheet original conveying means does not interfere with the original supporting carriage, a displaceable mirror for directing one of the two optical paths to the image carrier at a position whereat a first optical path from the sheet original image and a second optical path from the original image on the original supporting carriage, whereby the original image on the original supporting carriage and the sheet original image may be selectively projected onto the image carrier by the displaceable mirror.

It is a further object of the present invention to provide a copying machine in which an optical path leading from a lens directly or through a mirror to the illuminating station for the original supporting carriage or a sheet feeding station, with a displaceable mirror interposed in the optical path, can be turned back substantially in the opposite direction to the direction of the extension of the optical path and one optical path (a first optical path) is directed to the sheet feeding station while the other optical path (a second optical path) is directed to the illuminating station for the original supporting carriage, whereby the illuminating station and the sheet feeding station can be disposed as spaced apart from each other as possible, and in which the first and second optical paths are opposed to each other with a displaceable mirror interposed therebetween, whereby the sheet feeding station can be disposed to avoid the range of movement of the original supporting carriage and which is of the movable original supporting carriage type and relatively compact, two-mode type and yet can be enhanced in operability.

The invention will become more fully apparent from the following detailed description thereof taken in conjunction with the accompanying drawings.

DESCRIPTION OF THE PREFERRED EMBODIMENTS

Figure 1:
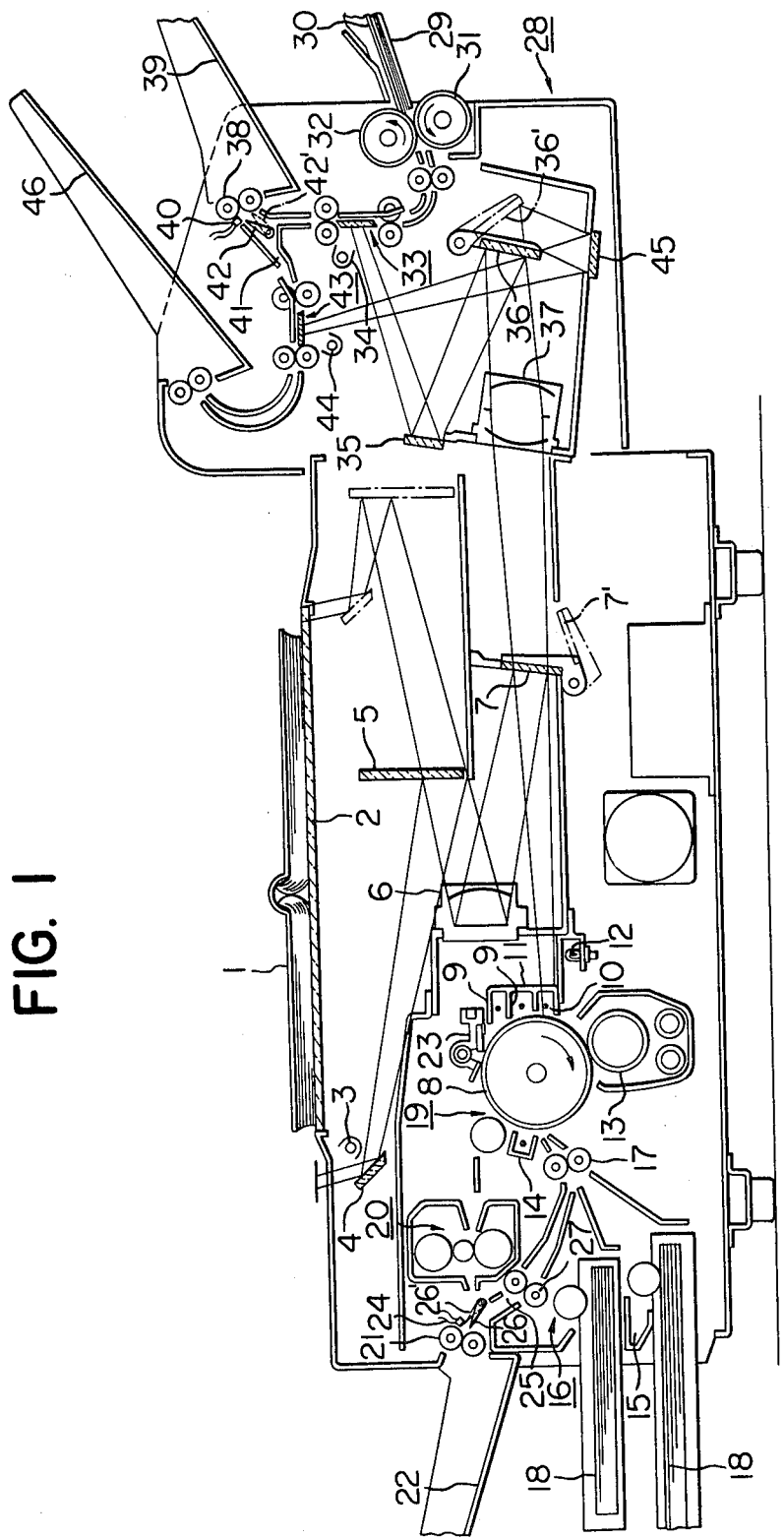
FIG. 1 is a longitudinal cross-sectional view showing an embodiment of the present invention.

Referring to FIG. 1, it shows an embodiment of the present invention. For a both-sided sheet original, there is (a) a case that the images on both sides of the original are copied on both sides of a copy sheet and (b) a case that the images on both sides of the original are copied on one side of each of two copy sheets.

The copying machine shown in FIG. 1 is an embodiment which is usable for any of the above two cases (a) and (b). This embodiment is constructed such that a stationary original can also be exposed to light, whereas the present invention is not restricted to the stationary original exposure system but it is equally applicable to the reciprocable original carriage exposure system and the objects of the present invention can be fully achieved even if such portion is eliminated.

The outline of the copying process will first be described in connection with FIG. 1. To make the present invention easily understood, description will be made with respect to the stationary original exposure system.

In FIG. 1, an original 1 is placed on an original carriage glass plate 2 on top of a machine housing which forms an original supporting carriage. The image of the original 1 is formed on a drum 8 by an optical system comprising an illuminating lamp 3, a first mirror 4 movable with the lamp 3, a second mirror 5 movable at half the velocity of the first mirror and in the same direction as the first mirror, a fixed in-mirror lens 6, and a change-over mirror 7. The surface of the drum 8 is a photosensitive surface which is uniformly charged by a primary charger 9 and when it comes to an image forming portion 10, it is exposed to light as described above and at the same time, it is discharged by a discharger 11. Subsequently, the drum surface is entirely exposed to light from a whole surface exposure lamp 12 to form an electrostatic latent image on the drum surface. The latent image on the drum is dust-developed into a visible image. Subsequently, the visible image on the drum 8 is transferred onto a copy sheet 18 by an image transfer charger 14, the copy sheet 8 being fed from a paper supply station 15 or 16 and having the leading end edge thereof registered with the leading end of the image on the drum by a set of register rollers 17. The copy sheet is then separated from the drum 8 at a separating station 19 and guided to a fixing station 20 and discharged through discharge rollers 21 onto a tray 22. During normal copy (one-side copy), this completes a copying cycle and on the other hand, the drum surface is cleaned by a blade 23 urged against the drum surface to remove any residual toner therefrom, thus becoming ready for use in the next cycle.

Further, the present copying machine can easily copy on both sides of copy sheets. That is, it is constructed such that when having completed one-side copying corresponding to normal copying, a copy sheet is again directed to the image transfer device for the back-side copying without being discharged out of the machine.

More specifically, a copy sheet passed through the fixing station 20 in a first copy cycle and conveyed by discharge rollers 21 has the passage of its trailing end edge detected by a light receiving element 24 and the discharge rollers are reversely rotated while the trailing end of the copy sheet is being nipped by and between the discharge rollers 21, so that the copy sheet is guided into a path 25 for back-side copying. A guide plate 26 is normally in its position indicated by solid line, but it is displaced to its position indicated by dots-and-dash line 26' as soon as the discharge rollers 21 are reversely rotated to guide the copy sheet into the path 25 for back-side copying, and the copy sheet is conveyed by conveyor rollers 27 and comes to a halt near the register rollers 17.

Subsequently, a second copy cycle is entered for back-side copying and the copy sheet is again fed into the image transfer device by a paper supply signal under the control of the register rollers 17 and after completion of the image transfer, the copy sheet is passed through the fixing station 20 and discharged onto the tray 22 by discharge rollers 21.

Description will now be made of an automatic sheet original feeding device 28.

When a start button (not shown) is depressed, sheet originals 30 resting on a sheet original supporting carriage 29 are fed one by one toward an illuminating station 33 by feed rollers 31 and 32. In the illuminating station 33, the sheet original is illuminated by an illuminating lamp 34 and the image thereof is projected onto the image forming portion 10 of the drum 8 by a stationary mirror 35, a change-over mirror 36 and a lens 37. At this time, the change-over mirror 7 is in its position indicated by dots-and-dash line 7' and does not interfere with the light path. Before and after the illuminating station 33, a detector comprising lamps and light-receiving elements for detecting the leading and trailing end edges of the original may be disposed as required, and effect the necessary mechanical control, but these are not described in detail here. Having passed through the illuminating station 33, the original sheet is discharged onto a tray 39 by discharge rollers 38. Where only one side of a both-sided sheet original is to be copied, or where an original having information on only one side thereof is to be copied, the above-described operation completes one exposure stroke for one sheet original. By repeating the same operation, all the sheet originals 30 on the sheet original supporting carriage 29 are finally fed onto the tray 39.

For both-sided sheet originals, the front and back surfaces thereof may be automatically exposed to light by doing the following. An original sheet having the front surface thereof illuminated by the illuminating station is conveyed thereafter by the discharge rollers 38 and if it is instructed beforehand to the apparatus that the original to be copied is a both-sided original, the passage of the trailing end edge of the original sheet is detected by a light-receiving element 40. The discharge rollers 38 are reversed in rotation while the trailing end of the original sheet is being nipped by and between the discharge rollers 38, and the original sheet is guided into a path 41 for back-side exposure. A guide plate 42 is in its position indicated by solid line during the normal front surface exposure, but when the back side of the original sheet is to be exposed, the guide plate 42 is displaced to its position indicated by dots-and-dash line 42' simultaneously with the reversal of the rotation of the discharge rollers 38. This makes possible the movement of the original sheet to the illuminating station 43 to effect the both-side copying of the original. In the illuminating station 43, the back side of the original is illuminated by an illuminating lamp 44 and projected onto the image forming portion 10 of the drum 8 by a stationary mirror 45, change-over mirror 36' and lens 37'. During the back side exposure, the change-over mirror 36 is changed over to its dots-and-dash line position 36' to make possible the formation of the above-described light path. Before and after the illuminating station 43, a detector comprising lamps and light-receiving elements for detecting the leading and trailing end edges of the original is disposed to effect the necessary mechanical control, but it is not described in detail here. The original sheet is finally discharged onto a tray 46, thus completing the exposure of the front and back sides of the both-sided sheet original. Thereafter, the same operation as described is repeated and all of the original sheets 30 on the sheet original supporting carriage 29 are finally fed onto the tray 46.

According to the present invention, as described above, two sheet original exposure systems and associatd conveyor devices are disposed for sheet originals, whereby both-side exposure of the sheet originals can be automatically effected. This eliminates the manual work of changing the exposed surface of the originals and thus, the present copying machine can fully demonstrate the performance of the conventional both-side copying machine. Moreover, it is not necessary to impose a burden upon the thick original copying portion which should be the basic portion of the copying machine, but an automatic sheet original feeding device may simply be added. Therefore, the machine can be highly reliable without hampering the basic performance as a copying machine. Also, the automatic sheet original feeding device has its own optical system which can accomplish optical adjustment independently of the optical system of the machine body and which can be assembled quite independently. Further, according to the present invention, the change-over between the exposure of the front surface of the sheet original and the exposure of the back surface of the sheet original may be effected simply by changing over a mirror and with very high accuracy. Also, the automatic sheet original feeding device and the thick original supporting carriage are spaced apart and the trays of the sheet original exposure devices are also spaced apart, so that no mutual interference occurs therebetween and the operability is very good during the operation of the copying machine.

In the embodiment shown in FIG. 1, both the feed rollers 31 and 32 are rotatable counterclockwise to feed sheet originals 30 one by one from the bottom thereof, and this is usually called the bottom separation. Where both sides of the original are to be copied, the aforementioned bottom separation is convenient in that the order of pages of the originals on the sheet original supporting carriage 29 is just coincident with the order of pages of the originals discharged into the tray 46. Further, where a both-side copy sheet is to be prepared from each of a number of both side sheet originals, the order of pages of the copy sheets discharged onto the tray 22 is very conveniently coincident with the order of pages of the above-mentioned original sheets. On the other hand, where only one side of the originals is to be copied, the order of pages of the original sheets on the sheet original supporting carriage and the order of pages of copy sheets discharged into the tray 39 are not coincident in the aformentioned bottom separation. In this case, if the original sheets 30 on the sheet original supporting carriage 29 are fed from the top thereof to the illuminating station 33 (top separation), then the order of pages of the originals discharged into the tray 39 will become just coincident with the order of pages of the sheet originals on the sheet original supporting carriage 29. Further, the order of pages of the copy sheets discharged into the tray 22 becomes coincident with the order of pages of the originals on the sheet originals supporting carriage 29. In this case, to effect the aforementioned upper side separation, the direction of rotation of the feed rollers 31 and 32 may be reversed from that in the above-mentioned case. In that case, by somewhat lowering the sheet original supporting carriage 29 from its shown position by any suitable means, the upper side separation of the original sheets can be facilitated. As has so far been described, if the feed rollers are rotated in normal or reverse direction in accordance with the both-side or the one-side exposure of sheet originals, the order of pages of the copy sheets and the order of pages of the originals discharged into the tray after exposure can be made coincident with the order of pages in which the originals to be copied were piled initially.

A combination of what have been described above with respect to FIG. 1 would lead to the following conceivable cases.

(1) provision of a single one-sided copy sheet from a single one-sided sheet original;

(2) copying information of two one-side sheet originals onto the front and back sides of a single copy sheet;

(3) copying the information of a single both-sided sheet original such that the information of the front side thereof is copied on one of two copy sheets and that the information of the back side thereof is copied on the other copy sheet; and (4) copying the information of a single both-sided sheet original onto both sides of a single copy sheet.

These items (1) to (4) are selected in accordance with the operation of the copying machine.

The copying machine embodying the present invention can have a wider performance. That is, in the above-described automatic sheet feeding device, the surface of the original to be copied is only once exposed by one of two exposure systems. It is therefore impossible to provide a number of copies from the same original. To overcome this, design may be made such that the same original can reciprocally move along the same illuminating station a plurality of times.

Figure 2:
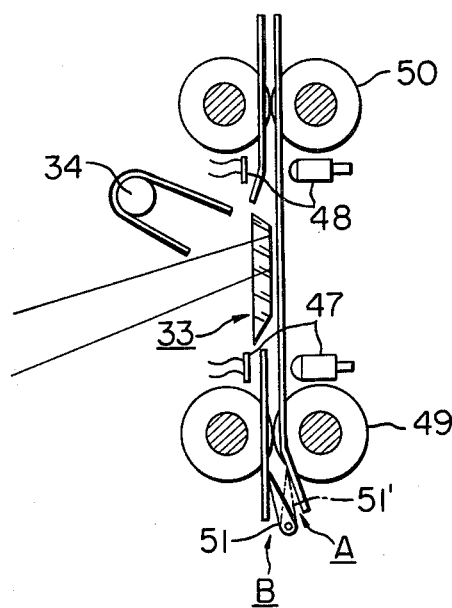
FIG. 2 is a fragmentary cross-sectional view showing the sheet original exposure station.

Only essential portions of an embodiment which satisfies the above-mentioned items is shown in FIG. 2. FIG. 2 is an enlarged view of the portions near the illuminating station in FIG. 1, and some members are added therein and detectors 47 and 48 each having a lamp and a light receiving element are disposed before and after the illuminating station 33. An original sheet fed from feed rollers 31, 32 is further conveyed by a conveyor roller 49 and has its leading end edge detected by the detector 47, and illuminated by the illuminating station 33, and further conveyed toward the tray by conveyor rollers 50. As soon as the trailing end edge of the original sheet passes through the detector 48, the conveyor rollers 50 reverse their direction of rotation to feed the original sheet in the opposite direction. Simultaneously with the reversal of rotation of the conveyor rollers 50, the conveyor rollers 49 are also reversed in direction of rotation, so that the trailing end of the original sheet passes between the conveyor rollers 49 and into an original sheet guide station B. A guide station A provides a path for the original sheet fed from the feed rollers 31 and 32. A guide plate 51 assumes its solid-line position when the sheet original is fed from the feed roller side, but is displaced to the dots-and-dash line position at the same time with the reversal of rotation of the conveyor rollers 49 and 50, thus enabling the original sheet to be conveyed into the guide path B. Thereafter, the guide plate 51 maintains its position 51' during the while exposure of the original is effected a necessary number of times. The length of the guide path B is of course sufficient to hold a maximum necessary length of original sheet and for example, it may be disposed rightwardly of the change-over mirror 36 in FIG. 1. As soon as the leading end edge of the original sheet passes through the detector 47, the reverse rotation of the conveyor rollers 49 and 50 is stopped so that the original sheet has its leading end nipped by and between the conveyor rollers 49. Thereafter, the conveyor rollers 49 and 50 again convey the original sheet toward the illuminating station 33. At that time, the original sheet has its leading end edge detected by the detector 47. Thereafter, the same operation as described is repeated and when the exposure of the same original is effected a necessary number of times, the original sheet is conveyed toward the illuminating station 43 for back-side copying of the original sheet, as already noted. The construction of the illuminating station 43 is just identical to the construction of the illuminating station 33, so that entirely the same operation can take place. When the exposure is effected the necessary number of times in the illuminating station 43, the original sheet is discharged into the tray 46. To satisfy the above-mentioned items, the discharge rollers 38, the guide plate 42, the light receiving element 40, etc. of course change the sequence so that they may operate suitably.

The reversal of the direction of rotation of the aforementioned conveyor rollers 49 and 50 may be effected by the use of two clutches. Here, only the case of the conveyor rollers 49 is described, whereas entirely the same construction may be employed for the other conveyor rollers. This will be described in connection with FIG. 3.

Figure 3:
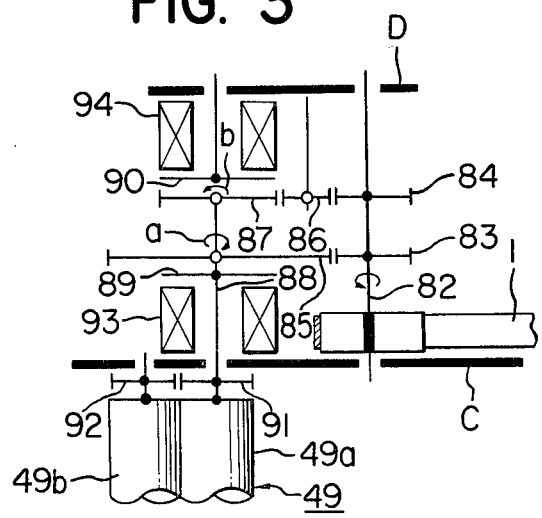
FIG. 3 is a fragmentary, schematic cross-sectional view showing the mechanism for reversing the direction of movement of the sheet original conveying portion.

In FIG. 3, the rotational drive from a motor or the like is transmitted to a rotary shaft 82 by drive connector means E such as chain or gear connection. The rotary shaft 82 is rotatably journalled to frames C and D and gears 83 and 84 are integrally disposed on the rotary shaft 82. The rotation of the gear 83 is transmitted to the input gear 85 of a forwardly moving clutch and the rotation of the gear 84 is transmitted to the input gear 87 of a backwardly moving clutch through an idler gear 86 changing the direction of rotation. Thus, the rotational drive from the motor or the like normally rotates the gears 85 and 87. On the other hand, a rotary shaft 88 integrally coupled to the conveyor roller 49a has one end thereof rotatably journalled to frames C and D and the other end rotatably journalled to an unshown frame. A rotor 89 for the forwardly moving clutch, a rotor 90 for the backwardly moving clutch and a gear 91 are coupled to the rotary shaft 88 for rotation with the latter. On the other hand, the conveyor roller 49b has one end thereof rotatably journalled to the frame C with the gear 62 integrally coupled to the conveyor roller 49b and the other end rotatably journalled to an unshown frame. Gears 61 and 62 are in mesh engagement so as to be rotatable urging against the rollers 49a and 49b. The aforementioned gears 85 and 87 are normally separated from the shaft 88 so that they merely slides on the rotary shaft 88 and the input from the motor or the like is not transmitted to the conveyor rollers 49. When the coil 93 of the forwardly moving clutch is excited, the gear 85 with the rotor 89 rotates the conveyor roller 49a in the direction of arrow a. When the coil 94 of the backwardly moving clutch is excited, the gear 87 with the rotor 90 is rotated to rotate the conveyor roller 49a in the direction of arrow b. In this embodiment, the conveyor rollers 49a and 49b are gear-connected, but they may be urged against each other.

As described above, by rotating the conveyor rollers in normal direction or reverse direction or stopping the same, the original can be reciprocated within the same illuminating station a plurality of times. The foregoing description has been made of the illuminating station 33 in connection with FIG. 2, and just the same thing holds true of the illuminating station 43.

Figure 4:
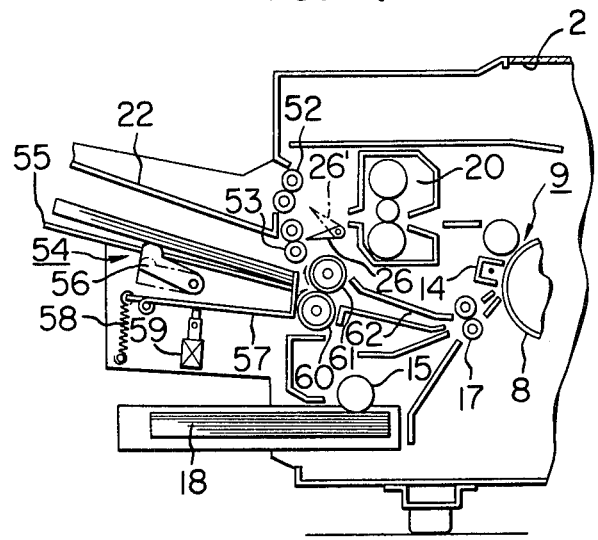
FIG. 4 is a fragmentary cross-sectional view showing the copy sheet feeding station.

As shown in FIG. 3, by addition of some parts and change of the sequence, it becomes possible to expose both sides of the original sheet to light a plurality of times. However, such performance cannot be fully demonstrated by the copy sheet feeding device shown in FIG. 1. Since exposure of the original is effected such that the front surface of the original is exposed to light a plurality of times, whereafter the back surface of the some original is exposed to light the same number of times, and therefore it is desirable to improve the feeding device so that the copy sheet repeats the same operation. Only essential portions of the feeding device which makes this possible are shown in FIG. 4. In FIG. 4, the members given reference characters similar to those in FIG. 1 are similar to the members in FIG. 1 and need not be described here.

In FIG. 4, where only one side copying is to be effected, the copy sheets are passed through the fixing station 20 and discharged into the tray 22 by discharge rollers 52. In that case, the guide plate 26 is in its dots-and-dash line position 26' to enable the discharge of copy sheets into the tray 22. On the other hand, when a both-sided sheet original is exposed to light a plurality of times as described in connection with FIG. 2, a copy sheet is passed through the fixing station 20 in correspondence with the surface exposure of the original and discharged into a cassette 54 by discharge rollers 53. Of course, at this time, the guide plate 26 is in its solid-line position. The copy sheet discharged into the cassette 54 and having only the front surface thereof printed with a copy is placed on an intermediate plate 55 fixed within the cassette 54. The intermediate plate 55 is apertured in a portion thereof and a lever 56 swingingly driven by a motor or a solenoid or the like (not shown) passes through the aperture to vibrate the underside of the copy sheet on the intermediate plate 55. By this vibration, the copy sheets piled on the intermediate plate 55 having their leading ends and side edges registered. Thereafter, in correspondence with the plurality of times of surface exposure of the original, a number of copy sheets equal thereto are aligned and piled in the cassette 54. The leading end edges of the copy sheets piled in the cassette 54 are registered with one another by a plate 57 pivotally provided on the underside of the intermediate plate 55. The plate 57 has one end thereof pulled by a spring 58 and the other end pulled by a solenoid 59. Normally, when the solenoid 59 is not attracted, the plate 57 is brought into a stable condition, as shown, by a stop or the like (not shown). As soon as the surface exposure of the original has been effected a plurality of times, the solenoid 59 begins to attract to cause the plate 57 to rock in clockwise direction. Because the intermediate plate 55 is fixed in position, the copy sheets piled on the intermediate plate 55 have the stop at the leading end thereof disengaged therefrom, so that the leading end edge of the copy sheets is moved rightwardly and downwardly in the drawing until it strikes against the paper feed rollers 60 and 61. The solenoid 59 continues to attract until the copy sheets in the cassette 54 are exhausted. The paper feed rollers 60 and 61 are both rotated clockwise, as shown, to feed the copy sheets from the bottom. The fed copy sheet passes through a guide path 62 and comes to a halt just before the register rollers 17. Thereafter, the copy sheet is fed toward the image transfer station in a timed relationship with the back-side exposure of the original sheet. Further, the copy sheet having an image transferred to the back-side thereof is passed through the fixing station 20 and discharged into the tray 22 by discharge rollers 52. Of course, at this time, the guide plate 26 has shifted to its position 26'. When the back-side exposure of the original sheet has been so effected a plurality of times, a number of back-side copies corresponding thereto are effected in succession.

In the manner described above, a plurality of both-sided copy sheets are automatically provided from a both-sided sheet original. Thus, the present invention can develop its function, in addition to the aforementioned items (1) to (4), such that a plurality of copy sheets can be provided from a single original sheet.

Figure 5:
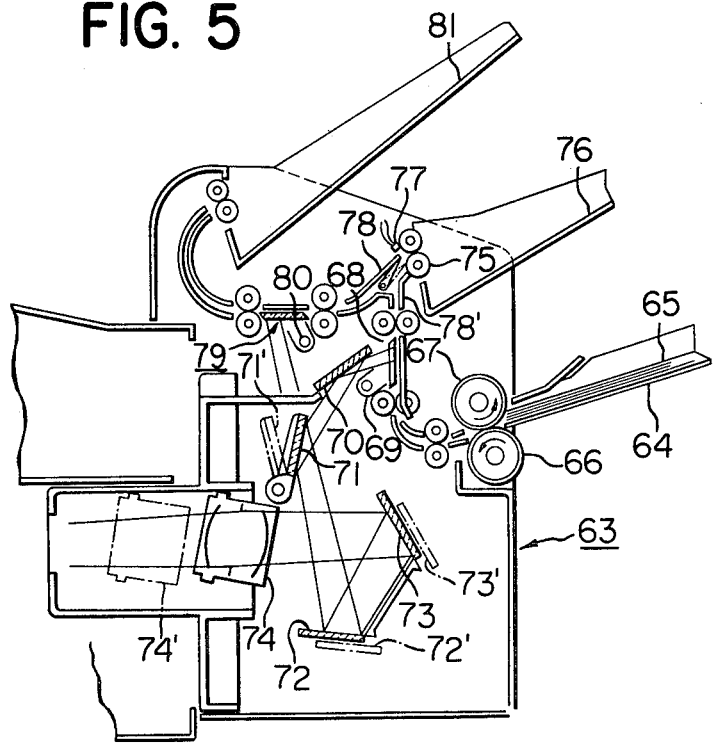
FIG. 5 is a fragmentary cross-sectional view showing the automatic sheet original feeding device.

FIG. 5 shows another embodiment of the automatic sheet original feeding device.

In FIG. 5, the automatic sheet original feeding device is designated by 63. This automatic feeding device 63 may be intactly replaced by the automatic sheet original feeding device 28 shown in FIG. 1. That is, the same feeding device can be used with a copying machine which is the basic model.

In FIG. 5, sheet originals 65 on the sheet original supporting carriage 64 are fed one by one from the bottom by feed rollers 66 and 67. The fed original sheet enters an exposure station 68 so that the front surface thereof may be exposed to light. In the exposure station 68, the original sheet is illuminated by an illuminating lamp 69 and the image thereof is formed on the image forming portion on the drum by a stationary mirror 70, a change-over mirror 71, movable mirrors 72 and 73 movable together, and a lens 74. The original sheet whose front surface has been exposed to light is discharged into a tray 76 by discharge rollers 75 and as soon as the passage of the trailing end edge of the sheet original is detected by a light-receiving element 77, the discharge rollers 75 reverse their direction of rotation. At the same time, the guide plate 78 is displaced to a position indicated by dots-and-dash line 78' to guide the original sheet to the exposure station 79 in order to expose the back side of the original sheet to light. In the exposure station 79, the original sheet is illuminated by an illuminating lamp 80 and the image thereof is formed on the image forming surface of the drum by the mirrors 72 and 73 and the lens 74. In that case, the change-over mirror 71 is displaced to its dots-and-dash line position 71' so as not to interfere with the light path. Thereafter, the original sheet is discharged into the tray 81. In this case, the number of mirrors differs from the front surface exposure to the back surface exposure of the original sheet and therefore, the illuminating lamp 69 must be increased in its quantity of light by the difference as compared with the illuminating lamp 80.

The function of reduction or enlargement may be readily added to the automatic sheet original feeding device shown. The positions of the mirror 72', the mirror 73' and the lens 74' indicated by dots-and-dash lines refer to the case where an image having a size of 0.707 time of the original image is formed on the surface of the drum. The mirrors 72 and 73 are moved together and the lens 74 is also moved independently of the mirrors, thereby accomplishing the reduction or enlargement of the size of the original image.

According to the present invention, as has hitherto been described, both sides of a plurality of both-sided originals can be automatically exposed to light and by addition of some members and change of the sequence, a desired number of copy sheets can be obtained from each of a plurality of both-sided originals, and this leads to the provision of an image formation apparatus whose function is greatly enhanced over the prior art.

Also, the present invention can provide a copying apparatus which permits addition of various automatic sheet original feeding devices without hampering the basic performance as a copier and which has wider functions. Accordingly, optical design and construction may be adopted for the essential portions of the copying apparatus and it is possible to obtain images of very high quality and to achieve a high reliability of the apparatus.

Another embodiment of the present invention will now be described. Members given reference characters similar to those in FIG. 1 are functionally similar to those in FIG. 1 and need not be described.

A thick original such as a book or the like is placed on an original supporting carriage glass plate 90 forming an original supporting surface on top of the machine housing. The original supporting carriage glass plate 90 is fixed to be original supporting carriage 91. The original supporting carriage 91 is movable to left and right (in the directions indicated by arrows) on the machine housing by the drive imparted thereto from a motor (not shown) through a clutch, pulleys, a wire, etc. The original is illuminated by an illuminating lamp 3 when the original supporting carriage 91 is moved in the direction indicated by a solid-line arrow. The image of the original is formed on the image forming portion 10 on a drum 8 through stationary mirrors 92, 93, an in-mirror lens 94 and a stationary mirror 95. In case of a thick original to be copied, a changeover mirror 96 is displaced to a dots-and-dash line position 96a so as not to affect the light path of the optical system.

In case of a sheet original or originals to be copied, utilization may be made of an automatic sheet original feeding station 97 disposed rightwardly of the apparatus. Sheet originals placed on an original supporting tray 98 may be fed one by one from the top thereof toward an illuminating station 101 by a set of feed rollers 99 and 100. The fed sheet original is illuminated by an illuminating lamp 102. Since the change-over mirror 96 is positioned at its solid-line position when the automatic sheet original feeding station 97 is used, the image of the original is formed on the image forming portion of the drum 8 through the change-over mirror 96, the stationary mirror 93, the in-mirror lens 94 and the stationary mirror 95. The original illuminated by the illuminating lamp 102 and whose image has been formed on the drum 8 through the exposure system is further fed and discharged through the discharge rollers 103 into an original discharge tray 104. This original feeding system separates and feeds the sheet originals from the top thereof (top separation), as already noted, and therefore the order of pages of the originals discharged successively into the tray 104 is entirely coincident with the order of pages of the originals when initially piled on the tray 98. Further, the order of pages of copy sheets is also conveniently coincident with the order of pages of the originals when they are discharged into a tray 22.

Figure 6:
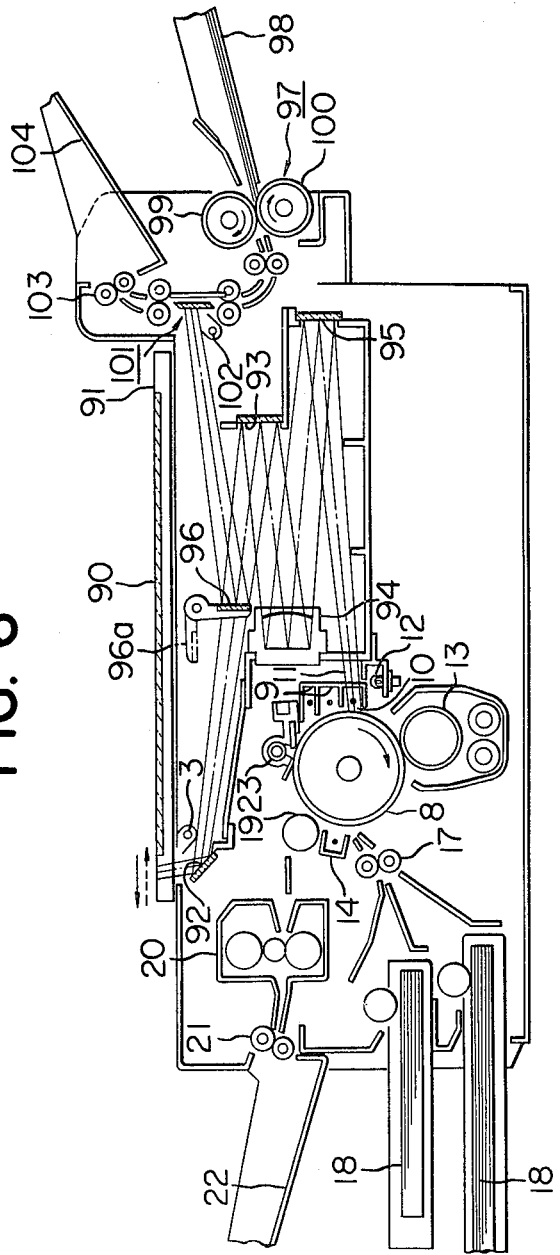
FIGS. 6 to 9 are longitudinal cross-sectional views showing further embodiments of the present invention.

The copying machine shown in FIG. 6 has an original carriage of a size which permits copying of maximum B4 format originals fed lengthwise thereof. In the sheet mode, it is also possible with the construction of the passageway of the original to copy a greater size of originals, such as, for example, A3 format originals. A feature of this optical system lies in that it has one in-mirror lens, three stationary mirrors and one change-over mirror and that three mirrors are disposed on the original illumination side and one mirror is disposed on the drum side, with respect to the in-mirror lens, and an intermediate one of the three mirrors on the original illumination side may be changed over or displaced at any time to simply change over the original supporting carriage exposure system and the sheet original exposure system. In other words, simply by displacing only one mirror, the other mirrors and in-mirror lens may all be fixed so as to ensure a high reliability of image formation. Also, this optical system can reduce the number of the mirrors used in spite of using a lens of relatively great focal length. Further, the use of an in-mirror type lens makes the optical system compact. Also, the original supporting carriage and the sheet feeding station can be disposed in spaced apart relationship with each other and this leads to the ability to set the originals indepently which in turn means a good operability.

Figure 7:
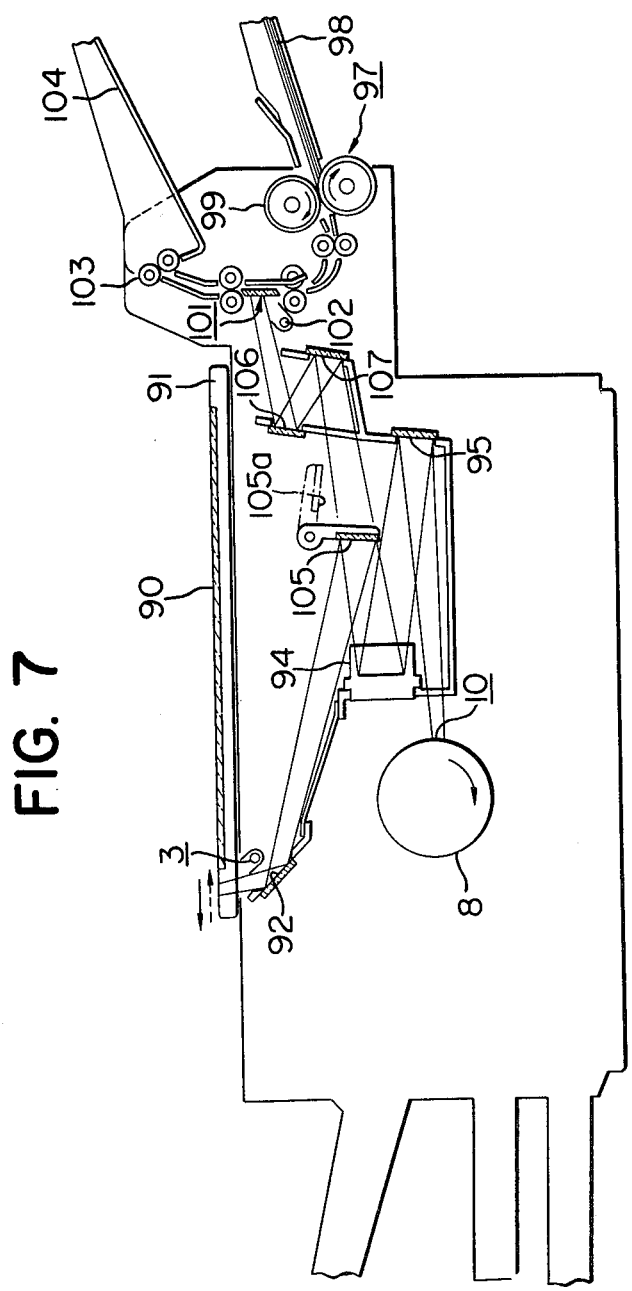

FIG. 7 shows a further embodiment of the copying machine according to the present invention. In FIG. 7, only the portions which are necessary to illustrate the present invention are shown and the other portions are identical to those in FIG. 6 and need not be described herein. A thich original on the original supporting carriage glass plate 90 fixed to the original supporting carriage 91 is illuminated by an illuminating lamp 3 and the image thereof is formed on the image forming portion of the drum 8 through a stationary mirror 92, a change-over mirror 105, an in-mirror lens 94 and a stationary mirror 95. When the original supporting carriage 91 is moved in the direction of arrow, the original is exposed to light and the image thereof is formed on the drum which is rotated in the direction of arrow at a velocity equal to that of the original supporting carriage. The automatic sheet original feeding station 97 is of entirely the same construction as that described in connection with FIG. 6. Sheet originals on the sheet original supporting tray 98 are separated and fed one by one from the top thereof by a feed roller 99. The fed original is illuminated at the illuminating station 101 by an illuminating lamp 102 and the image thereof is formed on the image forming portion of the drum 8 through stationary mirrors 106, 107, an in-mirror lens 94 and a stationary mirror 95. As described above, during the exposure of the sheet original to light, the change-over mirror 105 is displaced to its dots-and-dash line position 105a so as not to intercept the light path. Having passed through the illuminating station, the original is discharged into an original discharge tray 104 by discharge rollers 103.

The copying machine shown in FIG. 7 also has an original supporting carriage of a size which permits copying of maximum B4 format originals fed lengthwise thereof, but in case of sheet originals, it permits feeding of originals of larger sizes. A feature of the present optical system lies in that one more stationary mirror is provided as compared with the optical system of FIG. 6 but a change-over mirror is disposed immediately before the in-mirror lens and thus enables the copying apparatus to assume a two-mode construction even if a lens of relatively short focal length is used. Further, one change-over mirror is enough and the other mirrors and in-mirror lens may all be stationary to ensure a high reliability of image formation. Also, the use of the in-mirror lens leads to compactness of the optical system.

Figure 8:
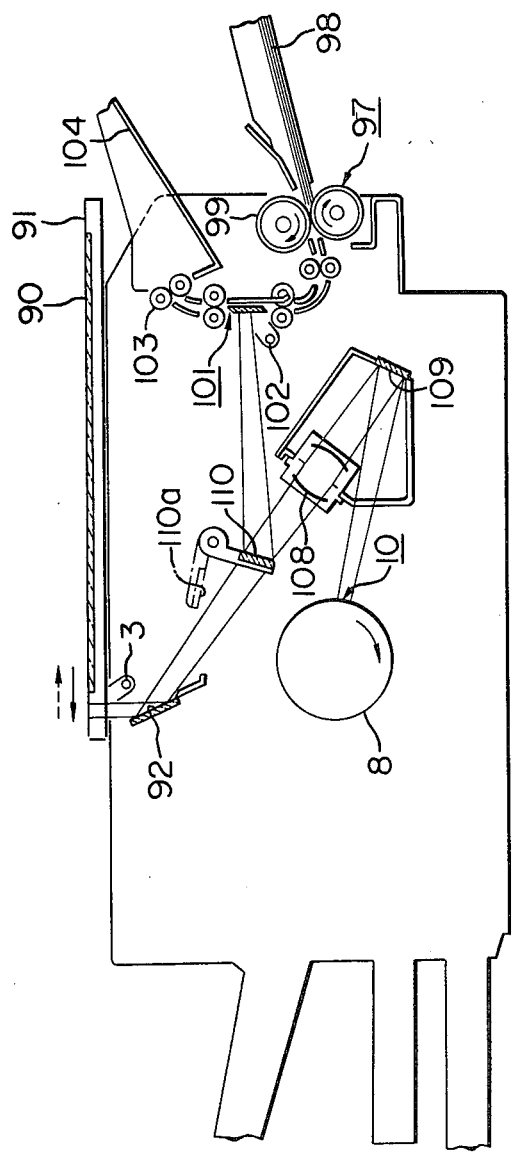

FIG. 8 shows still a further embodiment of the copying machine according to the present invention. An original placed on an original supporting carriage glass plate 90 secured to an original supporting carriage 91 is illuminated by an illuminating lamp 3 with the movement of the original supporting carriage 91 in the direction indicated by solid-line arrow and the image thereof is formed on the image forming portion of the drum 8 through a stationary mirror 92, a transmitting lens 108 and a stationary mirror 109. Of course, the drum 8 is rotating in the direction of arrow. During book mode copying, the change-over mirror 110 is displaced to its dots-and-dash line position 110a to form the aforementioned exposure system. On the other hand, as in the previous case, sheet originals can be copied by the use of an automatic sheet feeding station 97. The originals on the original supporting tray 98 are separated and fed one by one from the top thereof by a feed roller 99 toward the illuminating station 101. At the illuminating station, the fed original is illuminated by an illuminating lamp 102 and the image thereof is formed on the image forming portion 10 of the drum 8 through a change-over mirror 110, a transmitting lens 108 and a stationary mirror 109. During sheet original copying, the change-over mirror 110 is of course displaced to its solid-line position. Having passed through the illuminating station 101, the original is discharged into an original discharge tray 104 through discharge rollers 103.

The copying machine shown in FIG. 8 also has an original supporting carriage of a size which permits copying of maximum B4 format originals fed lengthwisely thereof and again in this case, sheet originals of larger sizes can be copied. A feature of this optical system lies in that only three mirrors are required because one transmitting lens is used. Further, only one change-over mirror is required as in FIGS. 6 and 7.

Another feature of the optical system shown in FIG. 8 lies in that the illuminating station for sheet mode is disposed at a relatively lower portion of the side of the copying machine to avoid the interference between the original supporting carriage and the automatic sheet feeding station and that effective utilization is made of the lower part of the portion of the original supporting carriage projected from the side edge of the apparatus.

Still a further feature of the present optical system is that the use of a transmitting lens leads to the possibility of a reduction mechanism being easily incorporated at a later time.

Figure 9:
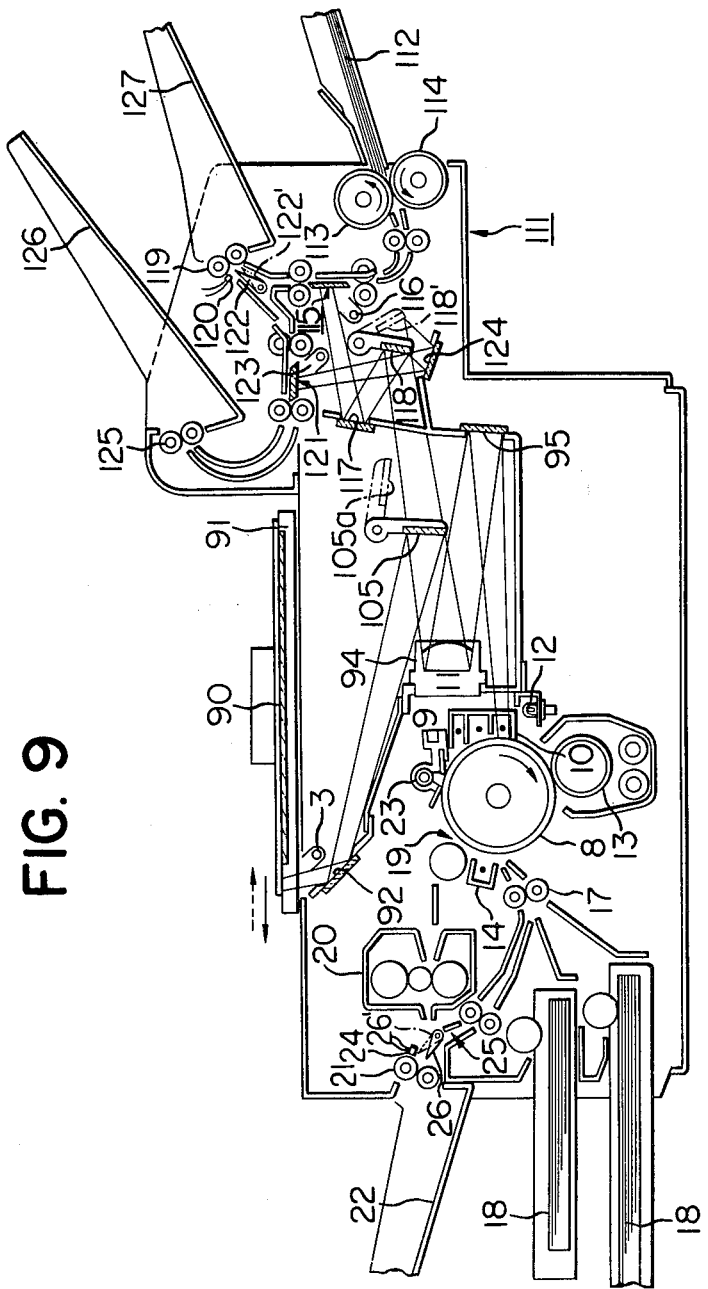

FIG. 9 shows an embodiment which has further been developed from the copying machine shown in FIG. 7. In FIG. 9, the members given reference characters similar to those in FIG. 7 are similar in construction and operation to those in FIG. 7. An original placed on an original supporting carriage glass plate 90 fixed to an original supporting carriage 91 is illuminated by an illuminating lamp 3 and the image thereof is formed on the image forming portion 10 of the drum 8 through a stationary mirror 92, a change-over mirror 105, an in-mirror lens 94 and a stationary mirror 95. The copy sheet to which the image has been transferred, if only one side thereof is to copy, is separated from the drum 8 at the separating station 19 and fixed in the fixing station 21, whereafter the copy sheet is discharged into the tray 22, but the present embodiment is constructed such that both sides of a copy sheet can copy. When a both-side copy instruction is put out from the operation side, the passage of the trailing end of the copy sheet is detected by a light receiving element 24. When the trailing end of the copy sheet is detected by the light receiving element 24, the discharge rollers 21 are reversed in direction of rotation while they are nipping the trailing end of the copy sheet therebetween, and feeds the copy sheet toward a path 25 for effecting the back-side copy of the copy sheet. The changeover guide 26 is normally in its solid-line position but when the back side copy of the sheet is to be effected, it is displaced to the dots-and-dash line position 26'. Thereafter, the copy sheet travels toward the drum 8 while being again subjected to the control of the register rollers 17 and has an image transferred to its back side, whereafter the copy sheet is separated from the drum 8 and fixed in the fixing station and then discharged into the tray 22. In the embodiment shown in FIG. 9, to effectively effect the above-mentioned back-side copying, an automatic sheet feeding station 111 is provided which enables both-sides exposure for sheet originals. Sheet originals placed on an original supporting carriage 112 are separated and fed one by one from the bottom thereof by feed rollers 113 and 114 (bottom separation). The fed original is illuminated by an illuminating lamp 116 at a first illuminating station 115 and the image thereof is formed on the image forming portion 10 of the drum 8 through a stationary mirror 117, a change-over mirror 118, an in-mirror lens 94 and a stationary mirror 95. During sheet mode copying, the change-over mirror 105 is displaced to its dots-and-dash line position so as not to intercept the light path. Having passed through the illuminating station, the original is further conveyed by discharge rollers 119 and, when the passage of the trailing end thereof is detected by a detecting element 120, the discharge rollers 119 are stopped while nipping the trailing end of the original therebetween. Thereafter, in timed relationship with the back-side copying, the discharge rollers 119 start rotating in reverse direction to feed the original toward a second illuminating station 121. At this time, the change-over guide 122 is displaced to its dots-and-dash line position 122' from it normal solid-line position to thereby facilitate the feeding of the original. In the illuminating station 121 for back-side copying, the original is illuminated by an illuminating lamp 123 and the image thereof is formed on the image forming portion 10 of the drum 8 through a stationary mirror 124, a changeover mirror 118', in-mirror lens 94 and the stationary mirror 95. During back-side copying, the change-over mirror 118 is displaced to its dots-and-dash line position. Having passed through the illuminating station 121, the original is discharged into an original discharge tray 126 by discharge rollers 125. If the sheet original is fed in the manner described above, the order of pages of the originals piled in the tray 126 and the order of pages of the copy sheets piled in the tray 22 are conveniently coincident with the order of pages of the originals initially piled. On the other hand, the sheet feeding device shown in the present embodiment can simply effect one-side copying as well. During one-side copying, as mentioned above, supplying the initially piled originals one by one from the top thereof is convenient to regularize the order of pages of the originals. Therefore, where only one-side copying is to be effected, the original supporting carriage 112 is displaced downwardly as viewed in the drawing and the feed rollers 113 and 114 may be rotated in the direction opposite to the direction of arrow. Further, the changeover guide 122 may remain in its normal solid-line position and the discharge rollers 119 may be rotated in a direction to discharge the originals into the discharge tray 127.

Figure 10:
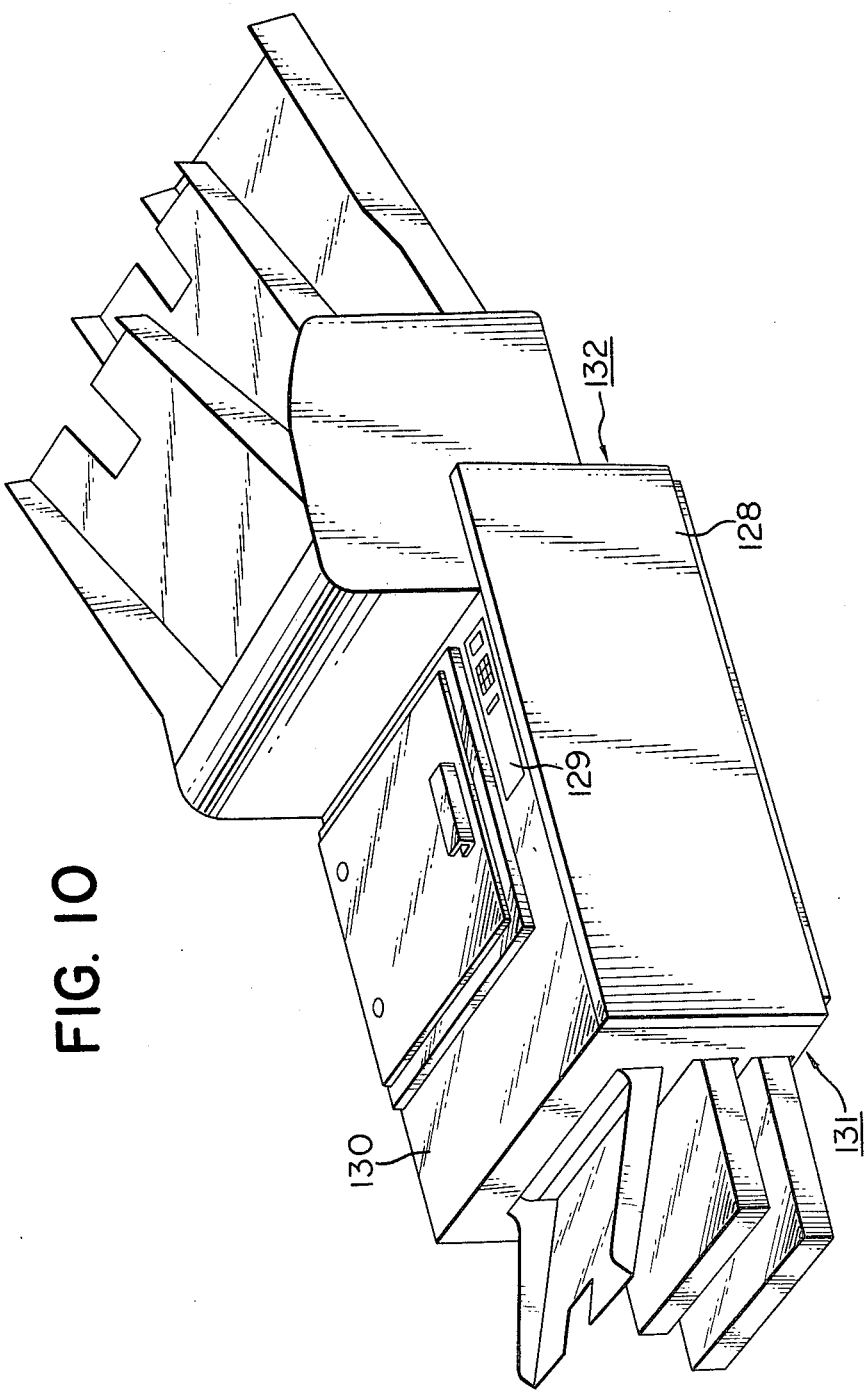
FIG. 10 is a perspective view corresponding to FIG. 9.

In the optical system of the embodiment shown in FIG. 9, the stationary mirror 107 shown in FIG. 7 is substituted for by the change-over mirror and the stationary mirror 124 is merely added. Thus, a feature of the present embodiment is that it is simple in construction with the number of mirrors reduced and the lens can be used commonly for the book mode and the sheet mode. Further, only two change-over mirrors are required and all the outer mirrors may be stationary, thus providing a compact copying machine which is usable for the book mode as well as for both-side sheet mode. Also, the present embodiment, as shown in FIG. 10, is such that the front 128 of the nearly rectangular parallelopiped machine housing is the operating side and the operating portion 129 is disposed on the front side of the upper surface 130 with the original supporting carriage disposed on the upper surface 130 and with the copy sheet feeding station disposed on one side 131. Also, the sheet original feeding station is disposed compactly at a position lying across the other side 132 and the upper surface 130 but which does not interfere with the original supporting carriage, thus enhancing the operability to a very high extent. Further, the original supporting carriage and the sheet feeding station are independent of each other and originals can be set independently. Furthermore, the both-side copying mechanism is disposed in the copy sheet feeding station to thereby enable both-side copying to be achieved at very high speed and to be entirely automatic. In the present embodiment, the original supporting carriage can effect sideways feeding of maximum B4 format original and can feed larger sizes of originals during the sheet mode.

Figure 11:
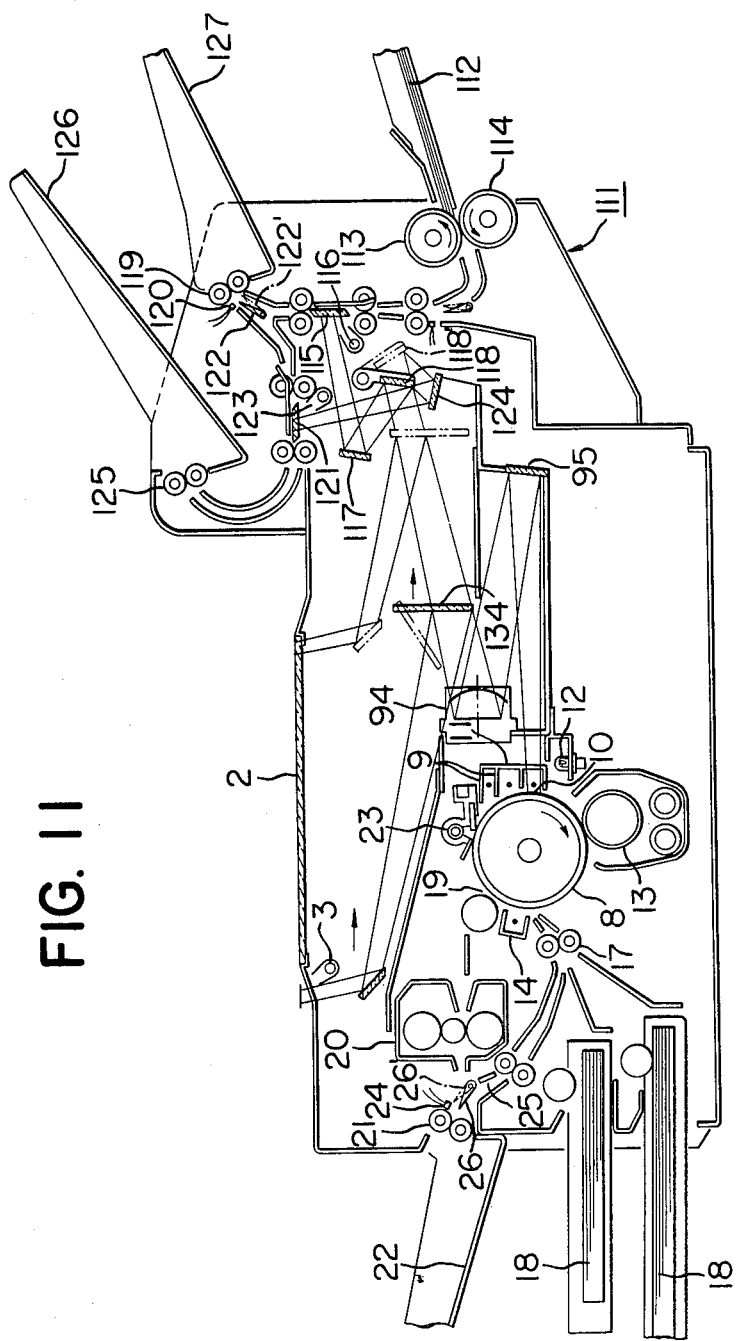
FIG. 11 is a longitudinal cross-sectional view showing still a further embodiment of the present invention.

FIG. 11 shows an embodiment which has further been developed from the copying machine of FIG. 9. In FIG. 11, the members given reference numerals similar to those in FIG. 9 are similar in construction and operation to those in FIG. 9. An original placed on the original supporting carriage glass plate 2 fixedly provided on top of the copying machine is illuminated by an illuminating lamp 3 and the image thereof is scanned by a movable mirror 133 and a movable change-over mirror 134 and is formed on the image forming portion 10 of the drum 8 through an in-mirror lens 94 and a stationary mirror 95. Thereafter, the process similar to that described in connection with FIG. 9 takes place. When the original on the original supporting carriage 2 is to be copied, the movable change-over mirror 134 is displaced to its solid-line position in the drawing, and when sheet originals conveyed on an automatic sheet feeding station 11 having a function similar to that described in connection with FIG. 9 are to be copied, the movable change-over mirror 134 is displaced to its dots-and-dash line position in the drawing. In the other points, the construction and operation of the FIG. 11 embodiment are similar to those of the FIG. 9 embodiment. Accordingly, in the present embodiment, the original supporting carriage is fixed to the upper part of the copying machine and the original is slit-exposed by a scanning optical system and one of the scanning movable mirrors is moved for change-over to enable either the original on the original supporting carriage or the sheet originals conveyed on the automatic sheet feeding station to be selectively copied, thus providing a two-mode copying machine in which two light parts are directed onto the photosensitive drum through a common lens. Also, the automatic sheet original feeding station has a mechanism for conveying both sides of sheet originals disposed across the upper part and side of the copying machine. Accordingly, the present embodiment provides a construction which can select a most compact arrangement and a copying machine which is highly practical. The embodiment of FIG. 11 has other advantages similar to those of the FIG. 9 embodiment.

What we claim is:

1. A copying machine comprising:
   a first sheet original illuminating and conveying means for moving sheet originals and exposing the same to light;
   a second sheet original illuminating and conveying means for moving sheet originals disposed at a position which does not interfere with said first sheet original illuminating and conveying means and exposing the same to light;
   means for controlling a sheet original so that one surface of the sheet original is exposed to light by said first sheet original illuminating and conveying means and that the other surface of the sheet original is exposed to light by said second sheet original illuminating and conveying means;
   a main optical means for forming a first and a second optical path so as to enable one of the images of the sheet original conveyed by said first or second sheet original illuminating and conveying means to be selectively exposed onto a photosensitive medium; and
   a first movable mirror change-over means for selecting one of the two optical paths of said optical means.

2. A copying machine according to claim 1, wherein said means for controlling the sheet original controls at least one of said first and second illuminating and conveying means to repeat the exposure of the sheet original a plurality of times.

3. A copying machine according to claim 1, wherein said first and second sheet original illuminating and conveying means are disposed such that the directions of conveyance of the sheet original thereby intersect each other.

4. A copying machine according to claim 1, further comprising a sub-optical means for forming a third optical path capable of projecting the image of the original onto a photosensitive medium from an original supporting carriage on which sheet originals or a thick original rests.

5. A copying machine according to claim 4, further comprising a second movable mirror change-over means for selecting one of said sub-optical means and said main optical means.

6. A copying machine according to claim 5, wherein said sub-optical means has an image forming lens independent of said main optical means.

7. A copying machine according to claim 5, wherein the third optical path by said sub-optical means forms an optical path directed to the image forming portion of said main optical means.

8. A copying machine according to claim 5, wherein said sub-optical means is a scanning optical system having a plurality of movable mirrors.

9. A copying machine according to claim 5, wherein said sub-optical means is a stationary optical system having a plurality of stationary mirrors.

10. A copying machine according to claim 9, wherein said second movable mirror change-over means is disposed at a position whereat the optical paths by said main optical means and said sub-optical means extend in substantially opposite directions to each other.

11. A copying machine comprising;
    a sheet original conveying means for moving a sheet original through a sheet original exposure station to expose the sheet original to light;
    a reciprocally movable original supporting carriage means for supporting thereon a thick original and for moving the thick original through a thick original exposure station, said original supporting carriage means being movable from a home position between said sheet original and thick original exposure stations in a direction away from said sheet original conveying means and then back to the home position while an exposure operation is being carried out;
    optical means including a mirror pivotable about a fixed axis located substantially in the middle between said sheet original and thick original exposure stations, said optical means defining a first optical path which extends from the sheet original exposure station substantially parallel to the reciprocation path of said original carriage and a second optical path which extends from the thick original exposure station substantially parallel to the reciprocation path of said original carriage but in substantially the opposite direction to the first optical path; and
    copy processing means for processing an image of the original projected onto a photosensitive medium by said optical means.

* * * * *